Patented Mar. 29, 1938

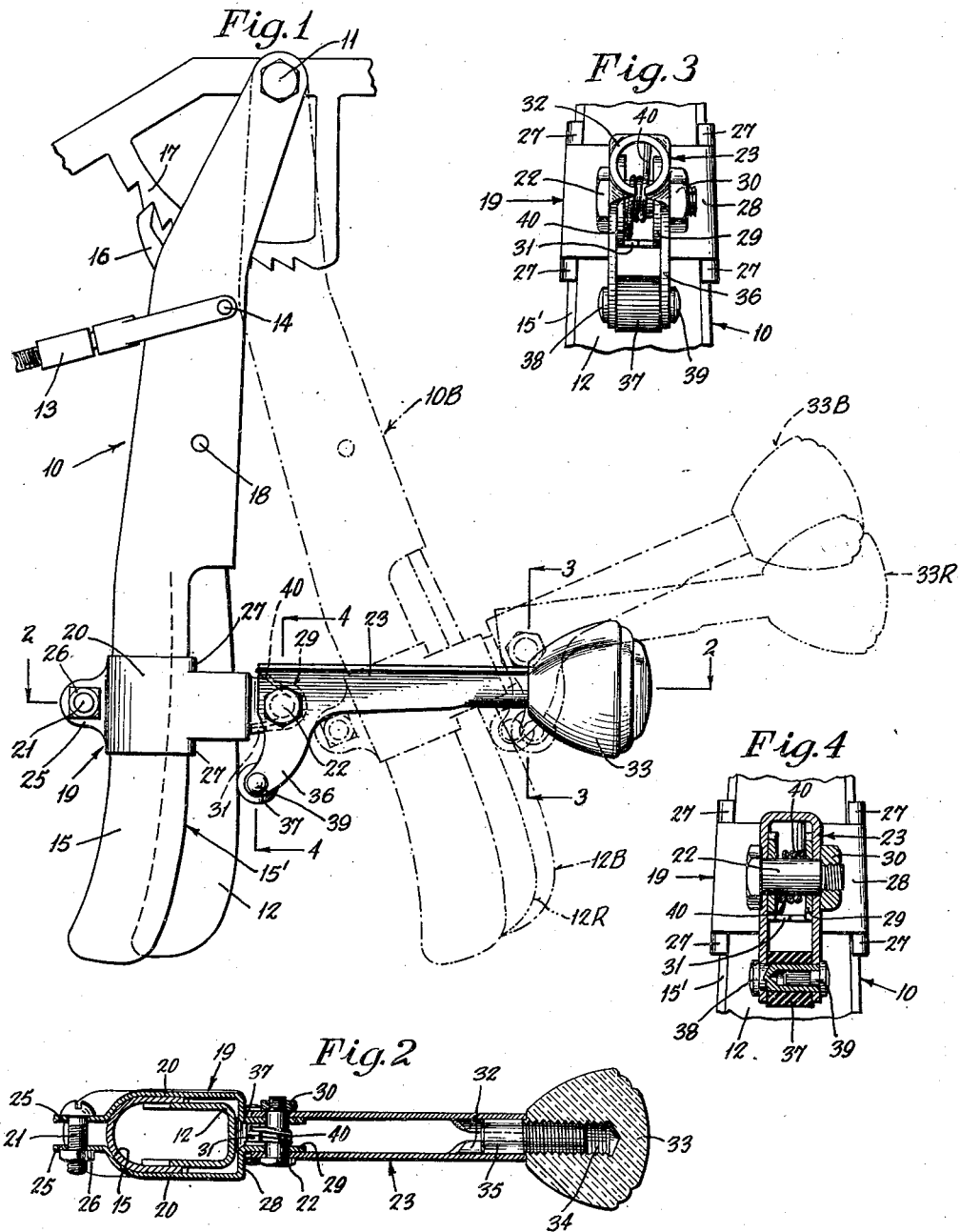

2,112,804

UNITED STATES PATENT OFFICE 2,112,804

BRAKE LEVER EXTENSION

Gustave F. Bahr, Fairfield, Conn., assignor to Casco Products Corporation, Bridgeport, Conn., a corporation of Connecticut Application April 1, 1937, Serial No. 134,301

21 Claims. (Cl. 74—479)

This invention relates to extensions for brake levers of motor vehicles.

Brake levers, whether of the type extending upward above a pivotal mounting or depending from a pivotal mounting near the upper end of the lever, are practically always in relatively inaccessible locations.

A form of brake lever now favored, and hung in either of the two ways just noted, is one the handle of which is hollow, and which has a brake-release grip within and partially projecting therefrom past edge portions running lengthwise of the handle.

The present invention has for its main object the provision of a brake lever extension adapted for ready and secure attachment to a brake lever of the kind referred to and which, when thus secured to the hollow handle, may be efficiently operated for both brake application and brake release.

A feature of the invention is the provision of a brake lever extension including a hanger for the extension lever which is gripped to the hollow handle of the brake lever by pressure against the edge portions of the handle past which the release grip projects, and which at the same time permits mounting of the extension lever in such manner that a natural pull on the same applies the brake, and a natural rocking of the extension lever toward the brake lever results in a movement of the release grip inward of the hollow handle thereby to cause release of the brake.

Another feature of the invention is the provision of an assembly of extension lever and hanger therefor, which is compact in size, attractive in appearance, and rugged in construction, yet of light weight and comparatively low cost of manufacture. For this purpose, the hanger comprises a caging structure for the brake lever handle including sheet metal parts of simple design, and the extension lever is shaped from a single sheet metal blank to provide a rod-like member which may be pivotally attached to the caging structure preferably just forward of the release grip.

As the invention is preferably carried out, the caging structure is comprised of a pair of plates one of which is a duplicate of the other, coupled in front of the release grip by a pivoting element for the extension lever and coupled at the back of the hollow brake handle by a draft means for forcing the plates together against the sides of this handle incidental to obtaining a grip on the forward edges thereof, by gripping means carried by the caging structure.

Various features and advantages will hereinafter appear.

In the accompanying drawing, which illustrates one form of my invention, that at present preferred:

Figure 1 is a view showing in side elevation a brake lever of the kind having a release grip partially within and partially projected from a hollow handle of the brake lever, and the extension of the present invention applied to such handle.

Fig. 2 is a horizontal section taken on the line 2—2 of Fig. 1.

Fig. 3 is an enlarged transverse vertical section taken on the line 3—3 of Fig. 1.

Fig. 4 is a view similar to Fig. 3, but taken on the line 4—4 of Fig. 1.

The accompanying drawing illustrates a brake lever 10 of the depending type, but only by way of example, and because such a brake lever is one now largely in use. The lever 10 is shown as pivotally mounted at 11, so as to depend below the dashboard (not shown) and at a point well forward in the car and with the release grip 12 facing the driver. Due to a brake-link 13 connected to the lever 10 at 14, brake application is effected by pulling the hollow handle 15 of the lever toward the driver, and the lever is set in brake-applying position by engagement between a locking pawl 16 and a ratchet segment 17. This pawl is carried by the brake lever 10 and extends into the hollow interior thereof, and by means not shown is operatively connected to the release grip 12, which is pivoted at 18 and which by spring means also not shown is yieldingly held to the normal partial protrusion from the hollow handle 15 illustrated. In order to release the brake, the driver grasps the lever at its lower end so as to squeeze together the handle 15 and the release grip 12, to move the grip deep enough into the hollow handle to cause withdrawal of the pawl 16 from the ratchet 17, and while the parts are thus arranged the lever is moved from set to release position.

The brake lever extension of the present invention, as the same is illustrated in the drawing, comprises a hanger 19 in the form of a caging structure including two identical sheet metal plates 20, coupled about the hollow handle 15 by a rear draft means including a bolt 21, and a front bolt 22 which also provides a pivot by which an extension lever 23 is mounted on the hanger ahead of but close to the release grip 12.

Each plate 20 as shown includes a main portion for lying against a side of the handle 15, an inwardly arched rearward extension of the main portion, and an ear 25 at the rear terminus of the plate. The ears 25 are provided with apertures which match laterally of the handle 15, for the reception of bolt 21, to which is applied a nut 26.

Also as shown, each plate 20 includes forward of its main portion which lies against a side of the handle 15, upper and lower pairs of inwardly directed wings 27, which engage the edge portions 15' of the hollow handle 15 beyond which the release grip 12 projects.

Each plate 20, between its upper and lower wing 27, extends forward in smooth continuation of the main portion of the plate, to a point just beyond the front of the release grip 12, and thence is bent inward toward the other plate, as shown most clearly in Fig. 2 at 28, and thence is continued as an ear 29 parallel with the main portion of the plate and substantially in the same plane as that containing the ear 25 of the plate. These ears 29 have matching apertures for the reception of the bolt 22, to which bolt a nut 30 is applied.

Further, each plate 20 as shown is provided with a finger 31 directed toward the other plate from the lower portion of the ear 29 at the root portion of such ear. As shown most clearly in Fig. 3, the ends of these fingers abut when the device is assembled to pivotally mount the extension lever 23 on the hanger 19 by application of the bolt 22 and nut 30.

The extension lever 23 as shown is formed of a single metal stamping and shaped so as to be L-shaped in side elevation as seen in Fig. 1. The lever 23 is in the main a rod-like structure of channel form, such channel extending all the way from the rear end of the lever to a point near the front end thereof where the metal piece of which the lever is made is curled into ring form as indicated at 32 to provide a tubular neck.

This neck facilitates mounting of a knob 33 in straight-line prolongation of the extension lever. As here shown, the knob, conveniently molded of some plastic material and provided with a tapped hole 34, has screwed in such hole the threaded end of a stud 35. This stud in rear of the knob has a cylindrical portion of a size to fit tightly within the neck 32 at the front end of the extension lever. The cylindrical end of the stud 35 is permanently secured in the neck 32, as by welding. The knob, being threadedly connected to the stud 35, may be easily replaced when damaged, or another knob may be readily substituted, as to match the general color tone of the interior of the car, or the taste of the driver.

At the rear end of the extension lever each of its channel sides is downwardly extended to provide like depending arms 36 for positioning an actuator 37 for the release grip at a point close to the hanger 19. As here shown, this actuator is in the form of a hard rubber or fiber roller journaled on a tubular stud 38 sent through matching apertures in the lower ends of arms 36 and held in place by a smaller stud 39 driven by force fit into the interior of the hollow stud 38, all as shown most clearly in Fig. 4.

In order to yieldingly urge the roller 37 against release grip 12, when the parts are assembled as shown in the drawing, thus to maintain the roller in anti-rattle engagement against the release grip, but with insufficient force to move the release grip to the extent required to disengage pawl 16 from ratchet 17, a coil spring 40 is carried by the pivot bolt 22. This spring is substantially completely hidden from view when the new device is applied to the brake lever 10 because the spring is mounted on the bolt 22 as just stated, and within the inverted channel of the extension lever 23. The spring is of the usual torsion type and has one end resting on the endwise abutting fingers 31 of the fixed hanger and the other end engaging the inner surface of the channel member to thereby provide a resilient connection between the fixed and movable member normally tending to move the member about the pivot and into engagement with the grip. The arrangement of the coil with respect to the fixed removable elements is very clearly seen in Fig. 1 and tends to move the extension lever in a clockwise direction.

Mounting of the new device on a brake lever of the kind for which the present invention has been made, whether of the upstanding or depending type, is quick and easy. The plates 20 are desirably stamped of a metal, as cold rolled steel, so that in the assembled hanger the ears 25 may be yieldingly and somewhat resiliently separated from each other when such separation is not interfered with by the draft means comprising the bolt 21 and nut 26. With these parts removed, to mount the device on the brake lever 10 it is merely necessary to arrange the plates 20 about the hollow handle 15 as shown, and preferably so that the roller 37 is below the pivot bolt 22 whether the brake lever is of the upstanding or depending type, and then, with the wings 27 engaging the edge portions 15' of the hollow handle of the brake lever 10, apply and tighten up the draft means comprising the bolt 21 and nut 26. When the nut 26 is drawn up tight on the bolt 21, the hanger 19 will be locked against rocking or any other shifting on the handle 15.

As the parts are shown in full lines in Fig. 1, the brake lever 10 is in release position. To apply the brake, an outward and upward pull on the knob 33 to draw the same to the position 33B throws the brake lever 10 to the position 10B, and on release of the knob the brake is held in set condition by engagement of the pawl 16 with the tooth of the ratchet 17 forward of the breast of which pawl 16 was moved. When later it is desired to release the brake, it is merely necessary to lightly press down on the knob 33, to swing the same from the position 33B to the position 33R, thereby to cause the roller 37 to force the release grip from the position 12B to the position 12R, thus lifting the pawl 16 clear of the ratchet 17, and continue to bear down lightly on the knob 33 during the resulting return of the brake lever 10 from the position 10B to the full line position of Fig. 1.

Variations and modifications may be made within the scope of this invention and portions of the improvements may be used without others.

I claim:

1. An extension for vehicle brake levers having a hollow handle and an elongate brake-release grip within and partially projected from said handle past edge portions thereof running lengthwise of the grip, comprising an extension lever; and a hanger for pivotally mounting said extension lever, said hanger including means for securing the same to the handle by engaging the latter intermediate the ends of the grip and over that part of the handle extending from said handle edge portions away from the grip, said securing means including means for seizing said handle edge portions, means for adjusting the hanger to force the means last-mentioned to such seizure, and means for mounting the extension lever so that it projects forward from its pivotal connection with the hanger, said connection being so placed that the release grip is between it and said securing means.

2. An extension for vehicle brake levers having a hollow handle and an elongate brake-release grip within and partially projected from said handle past edge portions thereof running lengthwise of the grip, comprising an extension lever; and a hanger for pivotally mounting said extension lever, said hanger including means for securing the same to the handle by engaging the latter intermediate the ends of the grip and over that part of the handle extending from said handle edge portions away from the grip, said securing means including means for seizing said handle edge portions, and a draft means operable in a direction substantially parallel to the axis of pivotal mounting of the extension lever on the hanger, for adjusting the hanger to force said seizing means to seize said handle edge portions.

3. An extension for vehicle brake levers having a hollow handle and a brake-release grip within the handle and projecting through an opening in the handle, comprising an extension lever; means on the extension lever for engaging and operating the brake-release grip; and means for mounting the extension lever on the hollow handle for pivotal movement including means engaging the surface of the handle opposite that through which the brake-release grip extends and means engaging the portion of the handle adjacent the opening through which the brake-release grip extends.

4. A brake lever extension as in claim 3, in which a draft means is provided which when tightened forces the handle-engaging means last-mentioned to tightly grip against the handle edges past which said grip projects.

5. An extension for vehicle brake levers having a hollow handle and an elongate brake-release grip within and partially projected from said handle past edge portions thereof running lengthwise of the grip, comprising an extension lever; and a hanger for pivotally mounting said extension lever and adapted to be mounted on said handle intermediate the ends of the grip but so as to avoid interference with the operation thereof, said hanger including side portions for clasping the opposite sides of said handle, there being short projections extended from said side portions toward the grip and engaging said edge portions of the handle.

6. An extension for vehicle brake levers having a hollow handle and an elongate brake-release grip within and partially projected from said handle past edge portions thereof running lengthwise of the grip, comprising an extension lever; and a hanger for pivotally mounting said extension lever and adapted to be mounted on said handle intermediate the ends of the grip but so as to avoid interference with the operation thereof, said hanger including a pair of plates which intermediate their lengths have wings bent therefrom, and means for coupling said plates to force said wings against said edges of the handle thereby to lock the hanger in place on the handle.

7. An extension for vehicle brake levers having a hollow handle and an elongate brake-release grip within and partially projected from said handle past edge portions thereof running lengthwise of the grip, comprising an extension lever; and a hanger for pivotally mounting said extension lever and adapted to be mounted on said handle intermediate the ends of the grip but so as to avoid interference with the operation thereof, said hanger including a plurality of clamping elements, and means for adjusting said elements to clamp them on said handle, said elements being constructed and arranged to be clamped to the handle by short projections engaging said edge portions of the handle on operation of the means last-mentioned.

8. An extension for vehicle brake levers having a hollow handle and an elongate brake-release grip within and partially projected from said handle past edge portions thereof running lengthwise of the grip, comprising an extension lever; and a hanger for pivotally mounting said extension lever and adapted to be mounted on said handle intermediate the ends of the grip but so as to avoid interference with the operation thereof, said hanger including a plurality of side walls shaped at their rear ends to embrace the back of the handle, said walls intermediate their front and rear ends carrying short elements shaped and located to engage said edge portions of the handle.

9. An extension for vehicle brake levers having a hollow handle and an elongate brake-release grip within and partially projected from said handle past edge portions thereof running lengthwise of the grip, comprising an extension lever; and a hanger for pivotally mounting said extension lever and adapted to be mounted on said handle intermediate the ends of the grip but so as to avoid interference with the operation thereof, said hanger including a plurality of side walls carrying wings at their top and bottom edges, the wings on one side wall being extended toward the wings on the other side wall so that all said wings will engage said edge portions of the handle.

10. An extension for vehicle brake levers having a hollow handle and an elongate brake-release grip within and partially projected from said handle past edge portions thereof running lengthwise of the grip, comprising an extension lever; and a hanger for pivotally mounting said extension lever and adapted to be mounted on said handle intermediate the ends of the grip but so as to avoid interference with the operation thereof, said hanger including a plurality of side walls carrying wings at their top and bottom edges, the wings on one side wall being extended toward the wings on the other side wall so that all said wings will engage said edge portions of the handle, portions of said side walls forward of said wings being extended past the front of the release grip and being apertured, there being a pivotal mounting for the extension lever including said apertures.

11. An extension for vehicle brake levers having a hollow handle and an elongate brake-release grip within and partially projected from said handle past edge portions thereof running lengthwise of the grip, comprising an extension lever; and a hanger for pivotally mounting said extension lever and adapted to be mounted on said handle intermediate the ends of the grip but so as to avoid interference with the operation thereof, said hanger including a plurality of side walls carrying wings at their top and bottom edges, the wings on one side wall being extended toward the wings on the other side wall so that all said wings will engage said edge portions of the handle, portions of said side walls forward of said wings being extended past the 12. An extension for vehicle brake levers having a hollow handle and an elongate brake-release grip within and partially projected from said handle past edge portions thereof running lengthwise of the grip, comprising an extension lever; and a hanger for pivotally mounting said extension lever and adapted to be mounted on said handle intermediate the ends of the grip but so as to avoid interference with the operation thereof, said hanger including side portions for gripping the opposite sides of said handle, said side portions carrying short elements shaped and located to engage said side edges of the handle and also parts shaped and located to engage the back of the handle.

13. An extension for vehicle brake levers having a hollow handle and an elongate brake-release grip within and partially projected from said handle past edge portions thereof running lengthwise of the grip, comprising an extension lever; and a hanger for pivotally mounting said extension lever and adapted to be mounted on said handle intermediate the ends of the grip but so as to avoid interference with the operation thereof, said hanger including side portions for gripping the opposite sides of said handle, said side portions carrying short elements shaped and located to engage said side edges of the handle and also parts shaped and located to engage the back of the handle, said side portions also carrying parts shaped and located ahead of the front of the handle to facilitate pivotal mounting of the extension lever on the parts last-mentioned.

14. An extension for vehicle brake levers having a hollow handle and an elongate brake-release grip within and partially projected from said handle past edge portions thereof running lengthwise of the grip, comprising an extension lever; and a hanger for pivotally mounting said extension lever and adapted to be mounted on said handle intermediate the ends of the grip but so as to avoid interference with the operation thereof, said hanger including side portions for gripping the opposite sides of said handle, said side portions carrying short elements shaped and located to engage said side edges of the handle and also parts shaped and located to engage the back of the handle, said side portions also carrying parts shaped and located ahead of the front of the handle to facilitate pivotal mounting of the extension lever on the parts last-mentioned, the extension lever being made of a single piece of sheet metal bent to channel form over the major part of its length and curled to ring form adjacent the outer end of the extension lever.

15. An extension for vehicle brake levers having a hollow handle and an elongate brake-release grip within and partially projected from said handle past edge portions thereof running lengthwise of the grip, comprising an extension lever having means thereon adapted to engage and move the grip release deeper into the handle when the extension lever is rocked in one direction on the hanger; and a hanger for pivotally mounting said extension lever and adapted to be mounted on said handle intermediate the ends of the grip but so as to avoid interference with the operation thereof, said hanger including side portions for gripping the opposite sides of said handle, said side portions carrying short elements shaped and located to engage said side edges of the handle and also parts shaped and located to engage the back of the handle, said side portions also carrying parts shaped and located ahead of the front of the handle to facilitate pivotal mounting of the extension lever on the parts last-mentioned, the extension lever being made of a single piece of sheet metal bent to a ring form adjacent the outer end of the extension lever.

16. An extension for vehicle brake levers having a hollow handle and an elongate brake-release grip within and partially projected from said handle past edge portions thereof running lengthwise of the grip, comprising an extension lever; and a hanger for pivotally mounting said extension lever and adapted to be mounted on said handle intermediate the ends of the grip but so as to avoid interference with the operation thereof, said hanger including side portions for gripping the opposite sides of said handle, said side portions carrying short elements shaped and located to engage said side edges of the handle and also parts shaped and located to engage the back of the handle, said side portions also carrying parts shaped and located ahead of the front of the handle to facilitate pivotal mounting of the extension lever on the parts last-mentioned, and there being a part carried by the extension lever adapted to engage and move the grip release deeper into the handle thereby to cause brake release operation of said grip, when the extension lever is rocked in one direction on the handle, there also being a spring engaging the hanger and the extension lever and always tending to rock the extension lever in said direction with insufficient force to effect brake release but with sufficient force to prevent rattling of the parts during vibrations or jouncing movements imparted to the extension lever.

17. An extension for vehicle brake levers having a hollow handle and an elongate brake-release grip within and partially projected from said handle past edge portions thereof running lengthwise of the grip, comprising an extension lever; and a hanger for pivotally mounting said extension lever and adapted to be mounted on said handle intermediate the ends of the grip but so as to avoid interference with the operation thereof, said hanger including side portions for gripping the opposite sides of said handle, said side portions carrying short elements shaped and located to engage said side edges of the handle and also parts shaped and located to engage the back of the handle, said side portions also carrying parts shaped and located ahead of the front of the handle to facilitate pivotal mounting of the extension lever on the parts last-mentioned, and there being a part carried by the extension lever adapted to engage and move the grip release deeper into the handle thereby to cause brake release operation of said grip, when the extension lever is rocked in one direction on the handle, there also being a spring engaging the hanger and the extension lever and always tending to rock the extension lever in said direction with insufficient force to effect brake release but with sufficient force to prevent rattling of the parts during vibrations or jouncing movements imparted to the extension lever, the extension lever being made of a single piece of sheet metal bent to inverted channel form adjacent said spring, the spring being within said channel and having one end bearing against the same, there being a support carried by a side wall of the hanger forward of the pivotal connection between the extension lever and the hanger, and the other end of the spring bearing against said support.

18. An extension for vehicle brake levers having a hollow handle and an elongate brake-release grip within and partially projected from said handle past edge portions thereof running lengthwise of the grip, comprising an extension lever; and a hanger for pivotally mounting said extension lever and adapted to be mounted on said handle intermediate the ends of the grip but so as to avoid interference with the operation thereof, said hanger including side portions for gripping the opposite sides of said handle, said side portions carrying short elements shaped and located to engage said side edges of the handle and also parts shaped and located to engage the back of the handle, said side portions also carrying parts shaped and located ahead of the front of the handle to facilitate pivotal mounting of the extension lever on the parts last-mentioned, the extension lever being made of a single piece of sheet metal bent to channel form over the major part of its length and curled to ring form adjacent the outer end of the extension lever, there being an enlarged handle on the extension lever, and means for mounting the enlarged handle on the extension lever in substantially straight-line prolongation thereof.

19. An extension for vehicle brake levers having a hollow handle and an elongate brake-release grip within and partially projected from said handle past edge portions thereof running lengthwise of the grip, comprising an extension lever; a hanger for pivotally mounting said extension lever at a point located thereon so that the projected part of the release grip is between said point and said handle; and a hanger incorporating a frame structure around the handle and the grip, said frame structure including means for gripping the handle at its sides and at its said edge portions for rigidly positioning the frame structure on the handle.

20. An extension for vehicle brake levers having a hollow handle and an elongate brake-release grip within and partially projected from said handle past edge portions thereof running lengthwise of the grip, comprising an extension lever; a hanger for pivotally mounting said extension lever at a point located thereon so that the projected part of the release grip is between said point and said handle; and a hanger incorporating a frame structure around the handle and the grip, said frame structure including means for gripping the handle at its sides and at its said edge portions, and draft means for imposing distorsional stress on portions of the frame structure thereby to rigidly clamp the hanger to the handle.

21. An extension adapted to be mounted on an operating handle, comprising an extension lever; a hanger for pivotally mounting the extension lever comprising a back wall and a plurality of side walls carrying wings at their top and bottom edges, the wings on one side wall being extended toward the wings on the other side wall; and means on the back wall for moving the wings into clamping position.

GUSTAVE F. BAHR.